United States Patent [19]
Palaith et al.

[11] Patent Number: 4,767,902
[45] Date of Patent: Aug. 30, 1988

[54] METHOD AND APPARATUS FOR THE MICROWAVE JOINING OF CERAMIC ITEMS

[75] Inventors: David E. Palaith, Washington, D.C.; E. Laurence Libelo, College Park, Md.

[73] Assignee: QuesTech Inc., McLean, Va.

[21] Appl. No.: 910,984

[22] Filed: Sep. 24, 1986

[51] Int. Cl.$^4$ .............................................. H05B 6/64
[52] U.S. Cl. .............................. 219/10.55 M; 264/26; 264/25; 156/89; 219/10.41
[58] Field of Search ................ 219/10.55 M, 10.55 R, 219/10.55 E, 10.41

[56] References Cited

U.S. PATENT DOCUMENTS

| | | | |
|---|---|---|---|
| 3,520,055 | 7/1970 | Jannett | 29/628 |
| 3,585,258 | 6/1971 | Levinson | 219/10.55 R |
| 3,732,048 | 5/1973 | Guerga et al. | 264/25 |
| 3,755,065 | 8/1973 | Chvatal | 156/89 |
| 3,841,870 | 10/1974 | Hamjian | 75/214 |
| 3,953,703 | 4/1976 | Hurwitt | 219/10.55 A |
| 3,998,632 | 12/1976 | Kosteruk et al. | 75/134 V |
| 4,003,368 | 1/1977 | Maxel | 219/10.55 M |
| 4,147,911 | 4/1979 | Nishitani | 219/10.55 M |
| 4,179,596 | 12/1979 | Bjork | 219/10.55 M |
| 4,219,361 | 8/1980 | Sutton et al. | 219/10.41 |
| 4,273,950 | 6/1981 | Chitre | 219/10.55 R |
| 4,292,262 | 9/1981 | Tobin, Jr. | 264/26 |
| 4,307,277 | 12/1981 | Maeda et al. | 219/10.55 R |
| 4,347,089 | 8/1982 | Loehman | 156/89 |
| 4,384,909 | 5/1983 | Layden | 156/89 |
| 4,529,856 | 7/1985 | Meek et al. | 219/10.55 M |
| 4,529,857 | 7/1985 | Meek et al. | 219/10.55 M |

OTHER PUBLICATIONS

Scott et al., "Diffusion Bonding of Ceramics", Aug. 1985, at pp. 1129–1131 in American Ceramic Society Bulletin.

*Primary Examiner*—Robert S. Macon
*Attorney, Agent, or Firm*—Joseph Scafetta, Jr.

[57] ABSTRACT

A method for joining together two ceramic items involves the steps of applying microwave radiation to the ceramic items, simultaneously applying compressive forces to the ceramic items in order to force such ceramic items together, and continually monitoring the joint being formed between the two ceramic items. An apparatus of three elements carries out the method. These elements are a single mode microwave applicator; a compressive force applicator; and a nondestructive evaluator for monitoring the formation of the joint.

22 Claims, 2 Drawing Sheets

METHOD AND APPARATUS FOR THE MICROWAVE JOINING OF CERAMIC ITEMS

FIELD OF THE INVENTION

The invention relates to a method and apparatus for the microwave joining of two materials, particularly ceramic items.

DESCRIPTION OF THE RELATED ART

The bonding together of ceramic materials is generally accomplished by many different methods and apparatuses. Exemplary methods and apparatuses are shown and described in U.S. Pat. Nos. 4,384,909, 4,347,089, 3,998,632, 3,841,870, and 3,755,065.

Other methods and apparatuses for bonding together two difficult materials by the application of microwave energy are disclosed in U.S. Pat. Nos. 4,273,950, 4,219,361, 4,179,596, and 4,003,368.

Methods and apparatuses for the microwave joining of ceramic items are specifically described in U.S. Pat. Nos. 4,529,857, 4,529,856, 4,307,277, 4,292,262, 4,147,911, 3,953,703, 3,732,048, 3,585,258, and 3,520,055.

Prior art apparatuses for making joints between ceramic materials by using microwave energy have sometimes employed ovens conventionally used for cooking food. In such ovens, the microwave field exists in many different orientations and the power supplied to the oven is distributed accordingly. Not all of these orientations or modes couple efficiently to the ceramic items being joined. Furthermore, no methods and apparatuses in the prior art are known to simultaneously apply compressive forces to the ceramic items in order to stimulate and enhance the joining together of such items and to continuously monitor the joint being formed between the two ceramic items in order to assure a good bond.

SUMMARY OF THE INVENTION

The primary object of the present invention is to use the more rapid and substantially uniform heating possible with microwave energy to join ceramic materials in order to obtain improved strength and reliability as compared to materials bonded by conventional heating methods and apparatuses.

The unique advantages of microwave heating derive from the fact that heat is produced internally in the material being joined through dissipation of the electromagnetic energy absorbed by molecular dipoles in the material.

Because neither conduction nor convection is required for heat to reach the interior of the material, heating is much more rapidly achieved and heat can be more uniformly distributed. Moreover, since the dominant heat loss mechanism is radiation from the outer surface of all heated materials, microwave-heated specimens show a residual temperature gradient that is the reverse of the temperature gradient that is the reverse of the usual gradient observed with conventional heating methods, i.e. the center is hotter than the outer surface.

Thus, the application of microwave energy to heat materials has three distinct advantages: substantially uniform heating, more rapid heating, and a reversed temperature gradient. These advantages enhance the properties of microwave-treated ceramic materials in several ways.

First, the substantial uniformity of heating tends to minimize the buildup of residual stresses, and, additionally, inhibits the diffusion of impurities throughout the material. Second, the more rapid heating prevents grain growth and the weakening usually associated with the longer heating times of conventionl thermal joining processes. Third, the reversed thermal gradient enhances the outgassing of impurities from the center to the outer surface of the material and is a new mechanism for controlled constituent diffusion.

The present invention has three additional advantages not found in the prior art methods and apparatuses for the microwave joining of ceramic material. First, a single mode microwave applicator is used so that the microwave field can be oriented to optimize the coupling of the radiation to the joint being formed, thereby increasing energy efficiency. Second, a compressive force is simultaneously applied to the ceramic items being joined so that the microwave joining process is essentially completed in a much shorter time than in a conventional heat-joining process. Third, the joint being formed is continuously monitored by a nondestructive evaluator to assure that a good continuous bond is formed.

Heretofore, continuous monitoring of each bond has not been possible without destroying at least one specimen in order to evaluate the characteristics of the entire batch formed at the same time under the same conditions. Nevertheless, defective joints in a so-called good batch were possible because of specific flaws unique to an individual specimen. The present invention insures that each bond has sufficient structural integrity because it uses a nondestructive evaluator to constantly monitor each bond during its formation.

Additionally, in regard to the single mode microwave applicator, only the ceramic joint area of the two items is directly heated. Although ceramic material remote from the joint area may be heated to a lesser extent by diffusion, the present invention is basically more efficient than the prior art convection and microwave ovens in which the entire mass of material inside the oven is heated. These conventional microwave ovens are energy-inefficient because mixed modes are used instead of only a single mode.

Compressive forces are easily applied to the ceramic items because only the region to be joined together is exposed to the microwave radiation while the rest of the ceramic material is outside of the single-mode microwave applicator. To the parts of the ceramic items outside of the applicator, a compressive force is applied, thereby speeding up the joining process.

Furthermore, because part of the ceramic items are outside of the applicator, a nondestructive evaluator can be attached directly to the ceramic items. For example, in this way, acoustic reflections from the joint region can be monitored and the quality of the joint being formed can be continuously assessed.

The joint or bond produced by the method and apparatus of the present invention is as strong as or stronger than the virgin ceramic material. Furthermore, no braze is required although brazing material may be used and is not precluded from use by the present invention.

These and other advantages of the present invention will be more fully understood from the following description of the drawings and the preferred embodiment.

DETAILED DESCRIPTION OF THE PREFERRED EMBODIMENT

Figure 1:
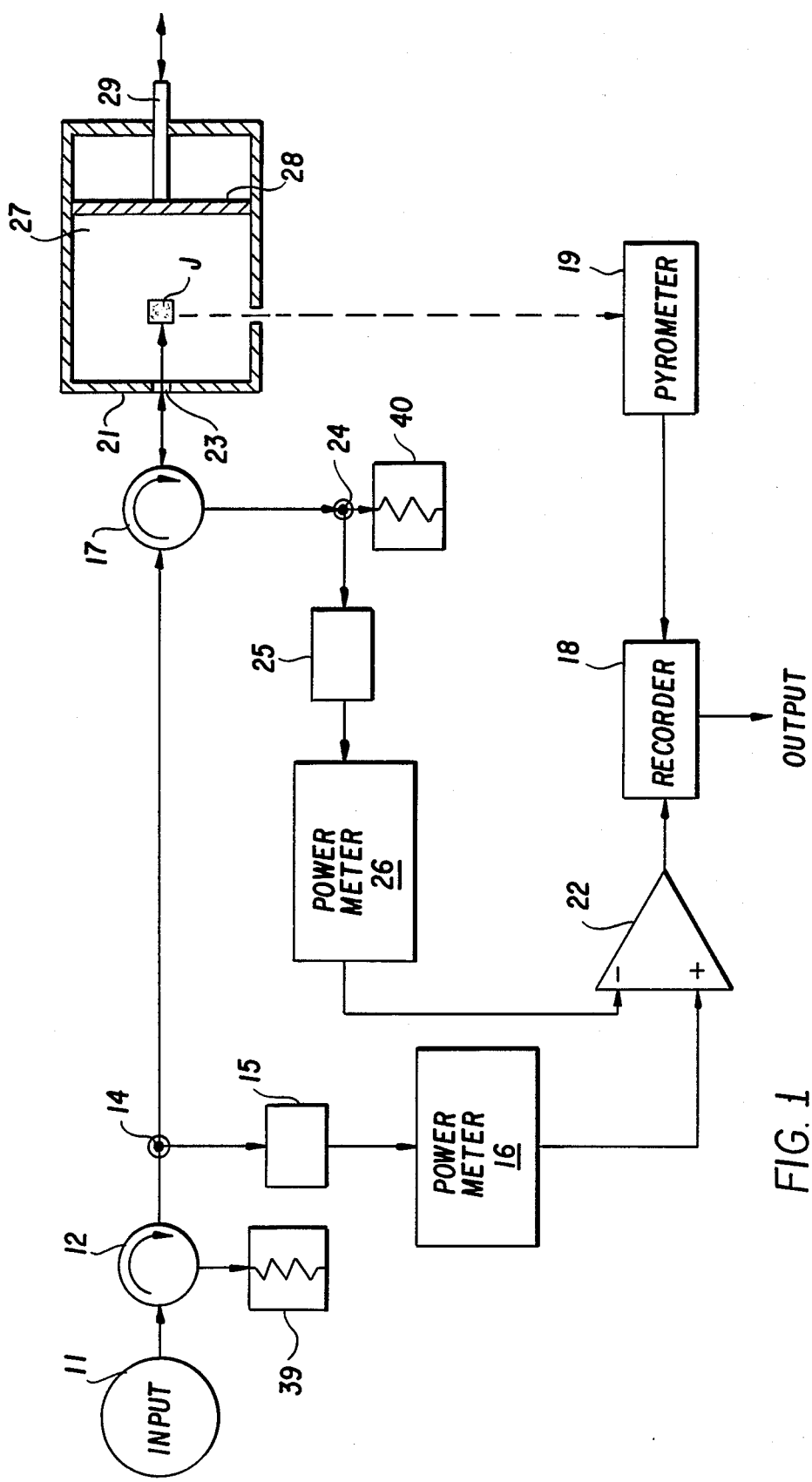
FIG. 1 is a schematic representation of the elements which form the apparatus for carrying out the steps of the microwave joining method of the present invention.

In FIG. 1, the apparatus for joining two ceramic items together by applying microwave energy is shown. A magnetron 11 generates a microwave signal and delivers up to 1,000 watts of power at a frequency of about 2.45 gigahertz (GHz) in the direction of the arrow which represents a waveguide.

A first circulator 12 directs the microwave energy in sequence along the path defined by the arrows and acts as a one way gate or insolator to protect the magnetron 11 against reflected microwaves. Any reflected microwaves are directed by this first circulator 12 to a first resistive load element 39 where they are dissipated.

A voltage sampling probe 14 senses the magnitude of the propagating voltage of the microwave and extracts a very small fraction of it. A power head 15 receives this small part of the propagating voltage and provides an output voltage proportional to the square of the input voltage. A power meter 16 is used in conjunction with the power head 15 to provide an output display and voltage proportional to the forward propagating microwave voltage. This output then is fed into a noninverting input of a differential amplifier 22.

Meanwhile, the remaining part of the forward propagating voltage is transmitted to a second circulator 17 which acts as a microwave bridge element. This second circulator 17 has two functions represented by the double-headed arrow on the right-hand side thereof. First, the circulator 17 allows microwaves to pass in the forward direction to a chamber 21. Second, the circulator 17 redirects power reflected from the chamber 21 to a voltage sampling probe 24, a power head 25, a power meter 26, and to an inverting input of the differential amplifier 22. Any excess reflected microwaves are directed by the second circulator 17 to a second resistive load element 40 where they are dissipated. The probe 24, power head 25, and power meter 26 are devices identical to the probe 14, power head 15, and power meter 16. However, the probe 24 senses the magnitude of reflected voltage and the power meter 26 provides an output display and voltage proportional to the reflected power, whereas the probe 14 and the power meter 16 deal with forward power.

Returning to the second circulator 17, the forward propagating voltage is fed into the chamber 21 through an adjustable iris 23 which focuses the microwave energy onto a joint J to be formed between two materials.

Figure 2:
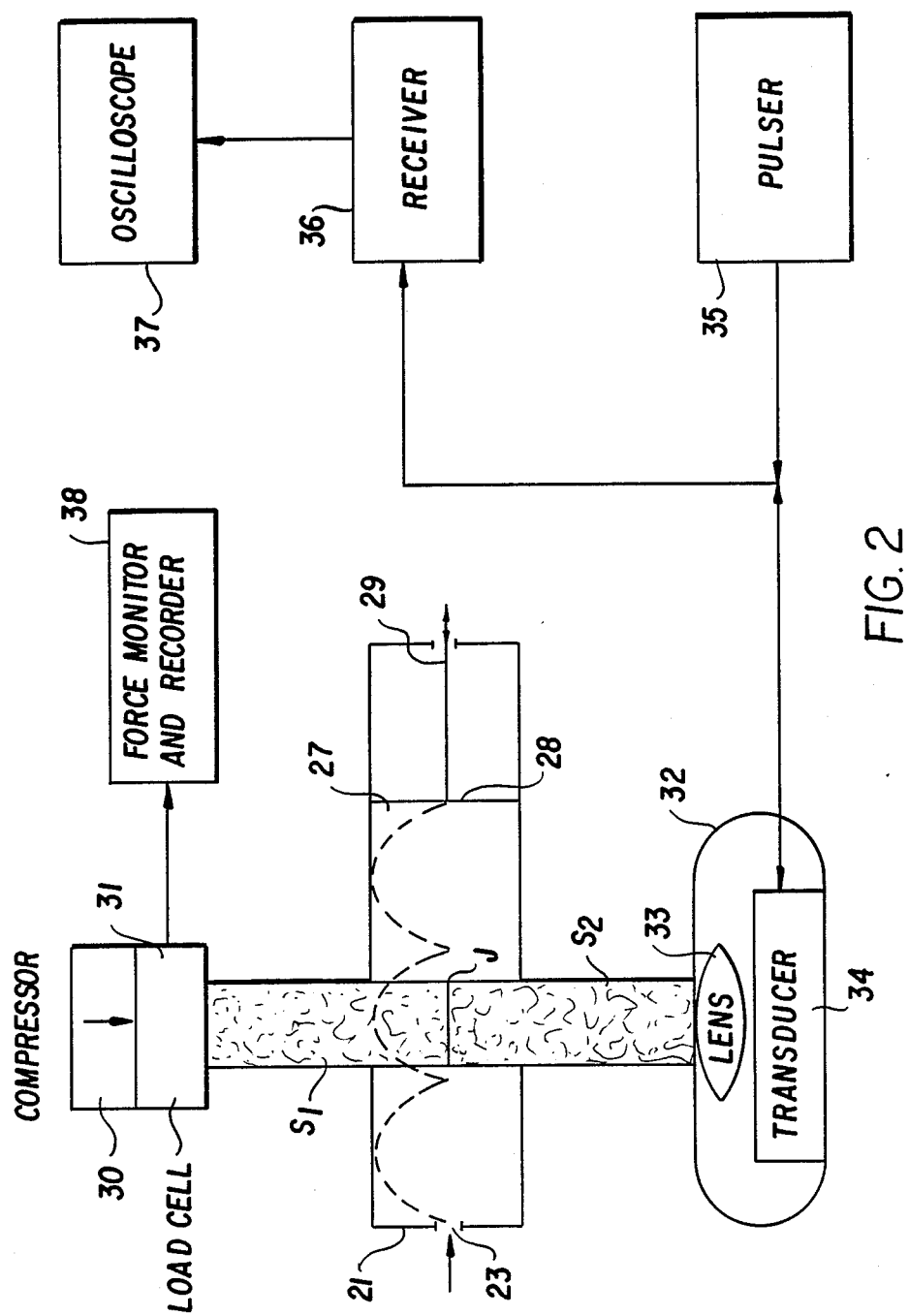
FIG. 2 is a detailed schematic representation of the compressor and the monitor which constitute two of the key elements in the apparatus for carrying out the method of the present invention.

In the preferred embodiment shown in FIG. 2, the materials are two ceramic items or samples $S_1$ and $S_2$. The chamber 21 has a internal microwave resonant cavity 27 which is adjustable in size by moving a slidable rear wall 28 forwardly and backwardly with a handle 29. Moving the handle 29 allows an operator to adjust the position of the rear wall 28 so that the length of the cavity 27 in the chamber 21 is changed. This change allows a change in the resonant frequency of the cavity 27 which, in turn, makes possible a standing microwave field inside the cavity 27 between the iris 23 and the slidable rear wall 28. Alternatively, the rear wall 28 may be fixed, thus giving rise to a predetermined resonant frequency in the cavity. However, in such a case, a microwave source of variable frequency must be used.

A compressor 30 is an hydraulic ram which is located at one end of the ceramic sample $S_1$ which protrudes outside of the chamber 21. The compressor 30 applies a force across the samples $S_1$ and $S_2$. A load cell 31 measures the static force applied to one end of the sample $S_1$ by the compressor 30.

The samples $S_1$ and $S_2$ may be any suitable ceramic such as alumina ($Al_2O_3$), mullite ($Si_2Al_6O_{13}$) or silicon nitride ($Si_3N_4$). Experimental data taken in the laboratory took into account both the dielectric properties of these specific ceramic materials and the radiation of heat from the outer surface of each sample $S_1$ and $S_2$. Initial heating rates for joining the oxide material samples were 20° C. per second typically, and were tested to 100° C. per second when exposed to the microwave radiation. The radial temperature profile for a $\frac{3}{8}$ inch diameter rod for samples $S_1$ and $S_2$ made of alumina was calculated to have a temperature difference of 2% between the center and the exterior surface with the center being hotter and, therefore, still maintaining a substantially uniform heating profile.

A nondestructive evaluator 32 is positioned at the lower end of the sample $S_2$ and constantly monitors acoustic pulses reflected from the region of the joint being formed inside the cavity 27. As long as there is a space or air gap at the joint J, acoustic pulses sent from the evaluator 32 along the sample $S_2$ will be reflected at this gap and sent back to the evaluator 32. When the gap in the joint region J no longer exists because a bond has been formed between the samples $S_1$ and $S_2$, the acoustic pulses from the evaluator 32 will pass from the sample $S_2$ along the longitudinal axis of the sample $S_1$, thus reducing the reflected acoustic pulses to zero magnitude and indicating that a bond is formed between the samples $S_1$ and $S_2$.

Returning to FIG. 1, it may be seen that, from the infrared pyrometer 19, the temperature measurements of the sample $S_2$ at the joint J are fed electronically to a free running two-channel strip chart recorder 18. In regard to the differential amplifier 22, it may be seen that the power which is applied to the joint J is the same in magnitude as the forward power minus the reflected power. Since a voltage proportional to the forward power is presented to the noninverting input of the differential amplifier 22, and a voltage proportional to the power reflected at the iris 23 is presented to the inverting input of the differential amplifier 22, the output voltage of the differential amplifier 22 is proportional to the microwave power in the cavity 27 inside the chamber 21. This power is the power available to be absorbed by the samples $S_1$ and $S_2$ at the joint J during formation of a bond thereat. The output of the differential amplifier 22, representing the available power for absorption, is fed into the recorder 18 and is graphed against time marked by the recorder 18 and also against temperature measurements taken at the joint J by the pyrometer 19. The output of the recorder 18 is a strip joint which graphs absorbed power and measured temperature versus elapsed time.

Returning to FIG. 2, the details of the compressor 30 and the nondestructive evaluator 32 are shown. When the microwave field enters the chamber 21 through the iris 23, the resonant frequency of the cavity 27 inside chamber 21 is adjusted by moving a slidable rear wall 28 with a handle 29 until a standing microwave field is established with a maximum amplitude of the electric field component at the joint J between samples $S_1$ and $S_2$.

Once the standing microwave field is established, force is applied by the compressor 30 to the exposed upper end of sample $S_1$ to aid in the formation of a bond at the joint J. At the opposite end of sample $S_2$, an acoustic coupling agent, e.g. grease, is applied to facilitate transmission of acoustic waves from the evaluator 32 along the sample $S_2$ to the joint J. Inside the evaluator 32, there is an acoustic magnifying lens 33 which maximizes the acoustic signal transferred to and from the sample $S_2$ to and from a transducer 34. The transducer 34 converts electric pulses received from a transmitter or pulser 35 into acoustic pulses and sends these acoustic pulses up sample $S_2$ to the joint J from which the acoustic pulses are reflected back through sample $S_2$ to the acoustic magnifying lens 33 and the transducer 34. On the return trip, the transducer 34 converts the acoustic pulses back into electric pulses which are sent to a receiver 36. The output of the receiver 36 then is displayed on an oscilliscope 37.

The compressor 30 and the evaluator 32 are both arranged outside of the chamber 21 which holds the microwaved samples $S_1$ and $S_2$ about which measurements are taken accurately without heat and radiation damage to the measuring instruments.

Returning to the oscilliscope 37, it should be known that such an instrument displays for viewing by an operator the electrical signals presented to its input terminals, e.g. in this case, electrical signals produced by the transducer 34 in response to reflections from the joint J between the samples $S_1$ and $S_2$ as they are bonded. As the samples $S_1$ and $S_2$ are joined, this acoustic pulse decreases in amplitude and eventually disappears when a good bond is made completely across the joint J.

Monitoring of this acoustic pulse allows the operator to observe the process of bond formation and to recognize any disbonds which may form inside the joined samples $S_1$ and $S_2$. Because the joined samples $S_1$ and $S_2$ can be evaluated without destruction of any of the ceramic items, quality control is greatly enhanced.

The elements described above constitute the components of the apparatus for the microwave joining of materials, such as ceramics. The process may be explained as follows by referring again to FIG. 1. The microwave energy propagates from the generating magnetron 11 along a waveguide schematically shown by the arrows to the chamber 21. As shown in FIG. 2, the standing wave of the microwave field has maximum amplitude at three nearly equally spaced positions. At one of these positions, the ceramic samples $S_1$ and $S_2$ are located so that they may absorb and dissipate as heat nearly all of the available microwave power.

The iris 23, which allows the microwave energy to enter the chamber 21, acts as a variable impedance transformer and matches the impedance of the cavity 27 to the impedance of the rectangular waveguide which leads the microwaves up to the chamber 21. Variable coupling is achieved by adjusting the opening of the iris 23 so as to control the degree of coupling.

The reason for using a chamber 21 with a cavity 27 which is adjustable in length by a slidable rear wall 28 is that, as opposed to a terminated waveguide section, the power in the cavity 27 is Q times the power in the propagating microwave field where Q is the quality factor of the cavity 27 defined as the ratio of $(2\pi f) \times$ (average energy stored per cycle) to the power lost. Therefore, since Q may be several thousand units, the cavity 27 requires very little incident power to achieve a high level of stored energy and so a high level of energy is available to be dissipated by the samples $S_1$ and $S_2$. Of course, the energy dissipated can never exceed that associated with the microwave being propagated outside the cavity 27.

In regard to temperature measurements, a thermocouple or thermistor cannot be inserted into the cavity 27 to measure the temperature of the samples $S_1$ and $S_2$ because any conducting material introduced therein will behave as an antenna or a section of a coaxial transmission line which could conduct the microwaves outside of the cavity 27. In fact, this phenomenon is the principle upon which the voltage coupling probes 14 and 24 are based. To avoid this phenomenon, the noninvasive temperature measuring technique of the present invention is used, i.e. measuring the intensity of the infrared radiation emitted from the outer surface of the heated sample $S_2$. This intensity is uniquely related, through Planck's radiation law, to the temperature at the surface of the material. Unfortunately, this relationship also depends on the emissivity of the surface. This emissivity is a measure of the radiative effectiveness of the surface such that, for a perfectly black surface, all radiation is either emitted or absorbed while, for a perfectly white surface, no radiation is either emitted or absorbed, i.e. it is all reflected internally or externally, respectively. For most surfaces, it is very difficult to know the emissivity with any precision. Thus, large temperature uncertainties can follow. In order to avoid these errors, the present invention employs a so-called "two-color" pyrometer 19 which causes such errors to be cancelled.

In order to test the expected advantages of the present invention, experiments were conducted using three inch long mullite rods of $\frac{3}{8}$ inch diameter. Samples $S_1$ and $S_2$ were commercially obtained from the McDanel Refractory Co.

As shown in FIG. 1, microwaves were supplied by magnetron 11 and were transmitted through the rectangular waveguide schematically shown by the arrows to the chamber 21 having the cavity 27 in which the samples $S_1$ and $S_2$ were arranged. The cavity 27 supported a single mode microwave field configuration and had a resonant frequency which was varied by adjusting the rear wall 28 after the microwave field entered the cavity 27 through the iris 23. The power absorbed by the samples $S_1$ and $S_2$ was measured as the difference between the forward power focused into the cavity 27 and the power reflected back out of the cavity 27. The samples $S_1$ and $S_2$ were placed at the maximum electric field amplitude of the standing microwave.

As shown in FIG. 2, the compressor 30, located outside the chamber 21, provided force to the samples $S_1$ and $S_2$ during the joining process. A load cell 31 measures the force and transmits its data to a force monitor and recorder 38 which displays the data for the operator. While fabricating the bond, the power absorbed, the temperature reached, and the pressure applied are monitored and recorded appropriately on the recorder 18 of FIG. 1 and the recorder 38 of FIG. 2 as a function of time. These measurements were made to be sure that optimization of the power, temperature, and compression, each as a function of time, occurred during the joining process.

As a result of the experiment using mullite, it was evident that the joined rods were at least as strong as the unjoined samples $S_1$ and $S_2$. Second, both optical and scanning electron microscopic examination of the region around the joint J revealed this region to be highly homogeneous with a uniform microstructure maintained across the interface between the two samples $S_1$ and $S_2$. Third, failure in flexure tests in four-point bend occurred at an average distance of 1.9 centimeters from the joint J, and with a modulus of rupture exceeding that of the virgin material. Thus, it appeared that the joints J were stronger than the virgin material in the samples $S_1$ and $S_2$. Thus, the great strength of identical bonds formed within fifteen minutes of heating time supports the conclusion that rapid heating is one key to the formation of bonds with adequate microstructural integrity.

These joints as well as joints made between alumina samples were thermal diffusion bonds. However, the present invention is also capable of handling brazed ceramic to ceramic joints.

For ceramic to metal joints, there are two different types of joints possible, namely the conventional braze joint and an indirect braze joint using an interlayer. To effect such ceramic to metal joints, the position of the metal rod or other type of nonceramic specimen must first be carefully adjusted so that the end to be joined to the ceramic rod or specimen coincides with and becomes a part of an interior wall of the cavity 27 inside the chamber 21. In order to tune the cavity 27 to resonance, the metal rod can then be inserted slightly through the top or bottom openings in the chamber 21. While metallic objects are generally to be avoided in microwave heating because they reflect rather than absorb electromagnetic energy, the metal rod inserted into the cavity 27 essentially serves as a capacitive post, and the electrical reactance of this post as well as its effect on the heating process can be computed with a high degree of accuracy. The ceramic specimen can then be brought into contact with the metal specimen and heated in exactly the same manner as in the ceramic to ceramic bonding process because the bond will still be formed at the maximum electric field position of the cavity 27 which will have been retuned for the metal to ceramic joining process. Note that the electric field is constant along the longitudinal axis of the cylindrical samples $S_1$ and $S_2$. Also, calculations of the temperature/time profile for a metal to ceramic joining process can still be made.

The foregoing preferred embodiments are considered illustrative only. Numerous other modifications and changes will readily occur to those persons skilled in the bonding art after reading this disclosure. Consequently, the disclosed invention is not limited to the exact method and apparatus shown and described hereinabove but is defined by the appended claims.

We claim:

1. A method for joining together two items, comprising the steps of:
   a. radiating microwaves onto a joint being formed between the two items;
   b. simultaneously applying compressive force to press the two items together at the joint; and
   c. nondestructively and automatically monitoring continuously the joint being formed between the two items.

2. The method according to claim 1 wherein:
   said microwave-radiating step includes the substep of applying direct single mode microwaves only to the joint being formed between the two items.

3. The method according to claim 1 wherein:
   said force-applying step includes the substep of applying the compressive force across the two items, one end of each item being located at a position remote from the joint being formed between the two items.

4. A method for joining together two items, comprising the steps of:
   a. radiating microwaves onto a joint being formed between the two items;
   b. applying compressive force simultaneously to the two items; and
   c. monitoring continuously the joint being formed between the two items;
   wherein said monitoring step includes the substep of nondestructively evaluating the joint being formed between the two items by measuring responses of said joint to acoustic stimulation.

5. A method for joining together two items, comprising the steps of:
   a. radiating microwaves onto a joint being formed between the two items;
   b. applying compressive force simultaneously to the two items; and
   c. monitoring continuously the joint being formed between the two items;
   wherein said monitoring step includes the substep of nondestructively evaluating the joint being formed between the two items by detecting and measuring spontaneous acoustic emissions from the joint.

6. A method for joining together two items, comprising the steps of:
   a. radiating microwaves onto a joint being formed between the two items;
   b. applying compressive force simultaneously to the two items; and
   c. monitoring continuously the joint being formed between the two items;
   wherein said monitoring step includes the substep of nondestructively evaluating the joint being formed between the two items by measuring stimulated acoustic emissions from the joint.

7. An apparatus for joining together two items, comprising:
   a. means for radiating microwaves onto a joint being formed between the two items;
   b. means for simultaneously applying compressive force to press the two items together at the joint; and
   c. means for nondestructively and automatically monitoring continuously the joint being formed between the two items.

8. The apparatus according to claim 9 wherein:
   said radiating means applies direct single mode microwaves only to the joint being formed between the two items.

9. The apparatus according to claim 7 wherein:
   said radiating means applies direct microwaves of variable frequency only to the joint being formed between the two items.

10. The apparatus according to claim 7 wherein:
    said force-applying means applies compressive forces across the two items, one end of each item being located at a position remote from the joint being formed between the two items.

11. An apparatus for joining together two items, comprising:
   a. means for radiating microwaves onto a joint being formed between the two items;
   b. means for applying compressive force simultaneously to the two items;
   c. means for monitoring continuously the joint being formed between the two items; and
   d. a chamber means for containing the two items between which a joint is being formed is an internal cavity having a resonant frequency, said chamber means having an adjustable iris means in a front wall thereof for allowing entry of microwaves and also having a movable rear wall means for allowing a change in the resonant frequency of the internal cavity.

12. An apparatus for joining together two items, comprising:
   a. means for radiating microwaves onto a joint being formed between the two items;
   b. means for applying compressive force simultaneously to the two items;
   c. means for monitoring continuously the joint being formed between the two items; and
   d. a chamber means for containing the two items between which a joint is being formed in an internal cavity having a predetermined resonant frequency, said chamber means having an adjustable iris means in a front wall thereof for allowing entry of microwaves and also having a fixed rear wall.

13. An apparatus for joining together two items, comprising:
   a. means for radiating microwaves onto a joint being formed between the two items;
   b. means for applying compressive force simultaneously to the two items; and
   c. means for monitoring continuously the joint being formed between the two items;
   wherein said monitoring means includes a nondestructive evaluating means for measuring responses of said joint to acoustic simulation.

14. An apparatus for joining together two items, comprising:
   a. means for radiating microwaves onto a joint being formed between the two items;
   b. means for applying compressive force simultaneously to the two items; and
   c. means for monitoring continuously the joint being formed between the two items;
   wherein said monitoring means includes a nondestructive evaluating means for detecting and measuring spontaneous acoustic emissions from the joint.

15. An apparatus for joining together two items, comprising:
   a. means for radiating microwaves onto a joint being formed between the two items;
   b. means for applying compressive force simultaneously to the two items; and
   c. means for monitoring continuously the joint being formed between the two items;
   wherein said monitoring means includes a nondestructive evaluating means for detecting and measuring stimulated acoustic emissions from the joint.

16. The apparatus according to claim 13 wherein:
said nondestructive evaluating means includes (i) a transducer means for converting electric pulses to acoustic pulses; and
(ii) an acoustic magnifying lens means for maximizing acoustic signals to and from the joint.

17. The apparatus according to claim 16 wherein:
said monitoring means includes a pulser means for transmitting electric pulses to the transducer means.

18. The apparatus according to claim 16 wherein:
said monitoring means includes means for receiving electric pulses from the transducer means for further transmission.

19. The apparatus according to claim 17 wherein:
said monitoring means includes an oscilliscope means for displaying the electric pulses transmitted further from the receiving means.

20. The apparatus according to claim 16 wherein:
said monitoring means includes a pyrometer means, connected to the nondestructive evaluating means, for measuring temperatures at the joint being formed between the two items.

21. The apparatus according to claim 20, wherein:
said monitoring means includes a recorder means, connected to the pyrometer means, for displaying a temperature/power/time profile.

22. The apparatus according to claim 21, wherein:
said monitoring means includes means, connected between the radiating means and the recorder means, for inputting a measurement of a difference between forward power from the radiating means and reflected power from the joint into the recorder means.

* * * * *

UNITED STATES PATENT AND TRADEMARK OFFICE
CERTIFICATE OF CORRECTION

PATENT NO. : 4,767,902

DATED : August 30, 1988

INVENTOR(S) : David E. Palaith and E. Laurence Libelo

It is certified that error appears in the above-identified patent and that said Letters Patent is hereby corrected as shown below:

Cover sheet, Section [58], add -- 156/89; 264/25, 26--
Col. 1, ln. 58, delete "the temperature gradient that is the reverse of"
Col. 3, ln. 21, "insolator" should be -- insulator --
Col. 4, ln. 64, "joint" should be -- chart --
Col. 5, ln. 25, "oscilliscope" should be -- oscilloscope --
Col. 5, ln. 31, "oscilliscope" should be -- oscilloscope --
Claim 8, ln. 1, "9" should be --7--
Claim 11, ln. 10, "is" (second occurrence) should be -- in --
Claim 19, ln. 2, "oscilliscope" should be -- oscilloscope --

Signed and Sealed this

Twenty-seventh Day of December, 1988

Attest:

DONALD J. QUIGG

*Attesting Officer*

*Commissioner of Patents and Trademarks*